United States Patent [19]

Corte et al.

[11] Patent Number: 5,115,866
[45] Date of Patent: May 26, 1992

[54] SOIL VAPOR WELL CONSTRUCTION

[75] Inventors: Lawrence J. Corte, Lakewood; Adrian Brown, Denver, both of Colo.

[73] Assignee: K N Energy, Inc., Lakewood, Colo.

[21] Appl. No.: 642,905

[22] Filed: Jan. 18, 1991

[51] Int. Cl.$^5$ .......................................... E21B 43/00
[52] U.S. Cl. ................................. 166/370; 166/52
[58] Field of Search ..................... 166/265–268, 166/369, 370, 278, 51, 242, 243, 228

[56] References Cited

U.S. PATENT DOCUMENTS

| | | | |
|---|---|---|---|
| Re. 33,102 | 10/1989 | Visser et al. | 166/267 |
| 1,896,212 | 2/1933 | Woods | 166/228 X |
| 2,157,085 | 5/1939 | Records | 166/228 X |
| 3,038,396 | 6/1962 | Jameson et al. | 166/228 X |
| 4,660,639 | 4/1987 | Visser et al. | 166/267 |
| 4,730,672 | 3/1988 | Payne | 166/266 |
| 4,886,119 | 12/1989 | Bernhardt et al. | 166/267 |
| 4,890,673 | 1/1990 | Payne | 166/266 |
| 4,901,796 | 2/1990 | Drnevich | 166/278 |
| 4,945,988 | 8/1990 | Payne et al. | 166/266 |
| 4,982,788 | 1/1991 | Donnelly | 166/370 X |
| 5,018,576 | 5/1991 | Udell et al. | 166/370 X |
| 5,050,676 | 9/1991 | Hess et al. | 166/370 X |
| 5,050,677 | 9/1991 | Payne | 166/51 X |
| 5,076,360 | 12/1991 | Morrow | 166/370 X |

Primary Examiner—Ramon S. Britts
Assistant Examiner—Roger J. Schoeppel
Attorney, Agent, or Firm—Fields, Lewis, Pittenger & Rost

[57] ABSTRACT

In accordance with this invention a soil vapor well for removing volatile hydrocarbons from the vadose zone is provided. The well comprises a larger diameter first bore hole extending from the surface of the earth for several feet and preferably to the base of the clay layer, an impervious casing having a smaller diameter than the first bore hole is mounted concentrically within the first bore hole and extends from the bottom of the first bore hole to a point above the surface of the earth. Concrete fills the space between the sides of the first bore hole and the casing to provide a substantially air-tight seal from the earth below the first bore to the surface of the earth. A second bore hole, having a diameter smaller than the diameter of the casing extends downwardly from the lower end of the casing to a point located above the water table. Aggregate fills the second bore hole and the casing. Means is connected to the upper end of the casing for drawing a vacuum to extract the volatile hydrocarbons from the surrounding portion of the vadose zone through the aggregate.

10 Claims, 1 Drawing Sheet

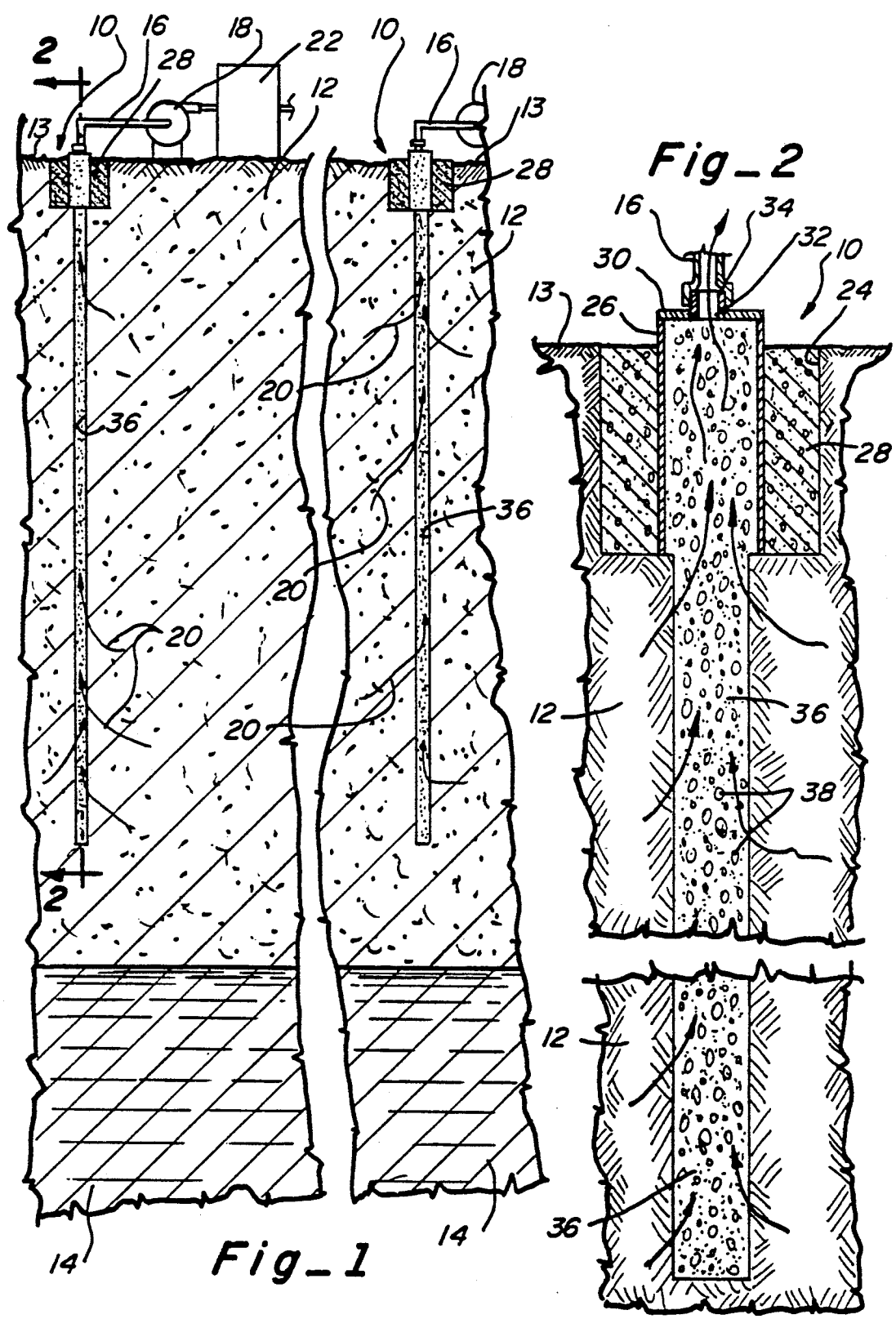

SOIL VAPOR WELL CONSTRUCTION

TECHNICAL FIELD

This invention relates to a soil vapor well construction and more particularly to such a construction which uses a minimal amount of material and requires a minimal amount of labor to install.

BACKGROUND ART

U.S. Pat. No. 4,660,639 to Visser et al. and U.S. Pat. No. Re. 33,102 to Visser et al. are each directed to an apparatus and method for removing volatile contaminants from the vadose zone of a contaminated underground area. This is accomplished by drilling a bore hole of a given diameter from the surface of the ground down through a contaminated area to a position just above the water table. A conduit or well casing, of smaller diameter than the bore hole, is inserted concentrically within the bore hole so that a ring or annular zone is defined between the wall of the bore hole and the wall of the conduit. The conduit has a perforate lower portion so that fluids can flow into the interior thereof whereas the upper portion of the conduit is imperforate. The annular zone between the perforate lower portion of the conduit and the bore hole wall is filled with a loose fluid-permeable first fill material, such as loose gravel, which extends substantially up to the upper end of the perforate lower portion of the conduit. The annular zone above the perforate lower portion of the conduit is packed with a second fill material of low permeability which is effective to impede flow of air from the ground surface downwardly toward the lower portion of the bore hole. Thus, the flow of air from above ground vertically downwardly into the conduit is minimized in order to increase the flow of the volatilized contaminate from the subsurface media into the conduit. A vacuum is applied to the upper end of the conduit so as to draw vapor of the contaminate present in the vadose zone into the lower portion of the conduit, the contaminate vapor then flowing to the upper end of the conduit from which it can be fed to other equipment for treatment, recovery or discharge. The perforate lower portion of the conduit is located in the vadose zone. When the perforate lower portion of the conduit extends into the saturated zone, no significant amount of ground water is drawn from the saturated zone into the conduit.

U.S. Pat. No. 4,730,672 to Payne, U.S. Pat. No. 4,890,673 to Payne and U.S. Pat. No. 4,945,988 to Payne et al. each disclose a method of removing volatile contaminates from the vadose layer of contaminated earth which comprise establishing a bore hole into the vadose layer which terminates above the water table. A loose pack fill, such as gravel is poured into the bore hole to a predetermined depth. A conduit such as an impermeable galvanized steel tubing is positioned in the bore hole spaced concentrically from the bore hole outer wall just above the fill material. The tubing is open at its lower end and at its upper end. The fluid permeable loose pack fill is then back filled into the bore hole to a level just above the tubing lower end as determined by the individual site soil conditions. A quantity of impermeable fill, such a bentonite or the like, is then packed above the remaining length of the tubing to the surface level with the tubing upper end extending slightly above the surface level. Each of the withdrawal wells, just described is surrounded by a multiple of air reinjection wells connected by a conduit. One or more pumps serve to draw the volatilized contaminate through the withdrawal well to the connecting conduit for collection. Residual air from the withdrawal well is urged back into the ground through the air reinjection wells to encourage further contaminant to move toward the withdrawal well for collection.

U.S. Pat. No. 4,886,119 to Bernhardt et al. is directed to a method for driving volatile impurities from the ground wherein a bore hole is provided with a central shaft whose upper end is sealed from the outside by a plate. A first non-perforated suction pipe extends in the drilling shaft to the proximate end of the shaft. A second suction pipe concentrically surrounds the first suction pipe, with a space therebetween, and extends to half the length of the drilling shaft. The inner ends of both pipes form suction locations. The ends of the suction pipes extend outside of the shaft in a fluid separating chamber. Means for drawing a vacuum is provided at the upper end of the drilling shaft. In addition, an air supply pipe extends through the closing plate so that outside air can flow into the drilling shaft. Sieve ring bodies are arranged at the ends of the suction pipes, each of which has a flexible sieve wall which can be composed of metal sieve web or synthetic plastic sieve web. The upper part of the shaft is supported by a loose aggregate material.

While each of the inventions described above fulfills its intended purpose, each structure is somewhat complex and therefore expensive to provide and requires significant labor for installation.

DISCLOSURE OF THE INVENTION

In accordance with this invention a soil vapor well for removing volatile hydrocarbons from the vadose zone is provided. The well comprises a larger diameter first bore hole extending from the surface of the earth for several feet and preferably to the base of the clay layer. An impervious casing having a smaller diameter than the first bore hole is mounted concentrically within the first bore hole and extends from the bottom of the first bore hole to a point above the surface of the earth. Concrete fills the space between the sides of the first bore hole and the casing to provide a substantially air-tight seal from the earth below the first bore to the surface of the earth. A second bore hole, having a diameter smaller than the diameter of the casing extends downwardly from the lower end of the casing to a point located above the water table. Aggregate fills the second bore hole and the casing. Means is connected to the upper end of the casing for drawing a vacuum to extract the volatile hydrocarbons from the surrounding portion of the vadose zone through the aggregate.

More particularly, in one form of the invention the first hole can be 12" in diameter and about 5' deep whereas the casing is 9" in diameter. The second hole is approximately 8" in diameter and extends downwardly to a point above the water table.

The structure just described is very simple, requiring only a 5' length of steel casing, concrete and suitable aggregate. By boring two holes, one of a first larger diameter and a second of a smaller diameter, and pouring concrete between the casing and the edge of the first bore hole, the well can be constructed with the use of few materials and little labor. Nevertheless, it is just as effective as the prior art wells which are much more complex to construct.

Additional advantages of this invention will become apparent from the description which follows, taken in conjunction with the accompanying drawings.

BRIEF DESCRIPTION OF THE DRAWINGS

FIG. 1 is a fragmentary vertical section through the earth showing wells constructed in accordance with this invention; and FIG. 2 is an enlarged, fragmentary, vertical section, taken along line 2—2 of FIG. 1, showing further details of the construction of the well.

BEST MODE FOR CARRYING OUT THE INVENTION

As best seen in FIG. 1, suitable wells 10 are strategically placed so as to extend into a volatile hydrocarbon contaminated vadose zone 12. As shown, the wells extend downwardly from the surface 13 of the earth through the vadose zone to a point above the water table 14. The top of the well is connected by a conduit 16 to a vacuum pump 18 which draws a vacuum in the well so that hydrocarbons move into the well as shown by arrows 20. The volatile hydrocarbons are carried up the well and through conduit 16 and pump 18 to a suitable device 22 which can be used to flair the hydrocarbons, to condense them into a liquid for disposal or further treatment or dispose of them in any other suitable manner.

The construction of well 10 can best be understood by referring to FIG. 2. In constructing the well, a first bore hole 24 of larger diameter is drilled. Conveniently, this bore hole may be approximately 12" in diameter and will have a length to go substantially to the bottom of the clay layer of the vadose zone or approximately 5'. Within first bore hole 24, an impervious steel casing 26 is positioned concentrically and the annular space between casing 26 and the edge of hole 24 is filled with concrete 28. After the concrete sets, it provides a seal so that air cannot pass downwardly into the vadose zone. Conveniently, casing 26 is of sufficient length to extend up above the ground and can have a diameter of about 8". Thus, the ratio of the diameter of the first bore hole to the second bore hole is three to two. The upper end of casing 26 is provided with a cover plate 30 having an opening 32 to which a fitting 34 is connected for attachment to pipe 16, as shown. A second smaller bore hole 36 is drilled from the bottom of the casing down to a point spaced above the water table 14. This bore hole may be approximately 8" in diameter and extends to a distance of 30' from the top surface. In other words, its overall length would be about 25' from the bottom of the first bore hole 24. Bore hole 36 is filled with aggregate 38 as is casing 26. Thus, when a vacuum is drawn through pipe 16, the volatile hydrocarbon gases will be drawn from the vadose zone into second bore hole 36 where they will be carried up through the aggregate in bore hole 36 and casing 26 to be discharged through pipe 16 and pump 18 into device 22, previously described.

It will be understood that the foregoing dimensions are given by way of example only and represent a preferred configuration. However, the first and second bore holes can be greater or smaller in diameter. A ratio of about three to two of the first bore hole diameter to the second bore hole diameter is preferable but not required. The depth of the first bore hole can vary but must be sufficient so that the concrete therein forms a substantial air seal between the second bore hole and the surface of the earth so that a vacuum can be drawn on the second bore hole to cause movement of the hydrocarbons from the surrounding earth into the second bore hole for extraction, as previously described. For the greatest efficiency and to obtain the greatest recovery of hydrocarbons, the depth of the second bore hole should be as deep as possible without going into the water table.

By this apparatus and method, a very inexpensive well has been provided both with respect to the materials used and with respect to the labor involved in its construction.

This invention has been described in detail with reference to a particular embodiment thereof, but it will be understood that various other modifications can be effected within the spirit and scope of this invention.

We claim:

1. A soil vapor well for removing volatile hydrocarbons from the vadose zone in the earth, said well comprising:
    a larger diameter first bore hole and having side edges extending from the surface of the earth to a first depth;
    an impervious casing having a smaller diameter than said first bore hole mounted concentrically within said first bore hole and extending from the bottom of said first bore hole to a point above the surface of the earth;
    concrete filling the space in said first bore hole between said casing and said side edges of said first bore hole to provide a substantially air-tight seal between the earth below said first bore hole and the surface of the earth;
    a second bore hole, having a smaller diameter than the diameter of said casing, extending downwardly from the lower end of said casing to second depth located above the water table;
    aggregate filling said second hole and said casing; and
    means connected to the upper end of said casing for drawing a vacuum in said second bore to extract the volatile hydrocarbons from the surrounding portion of the vadose zone through said aggregate and said casing.

2. Apparatus, as claimed in claim 1, wherein:
    said first bore hole is approximately 12" in diameter;
    said casing is approximately 9" in diameter; and
    said second bore hole is approximately 8" in diameter.

3. Apparatus, as claimed in claim 1, wherein:
    said aggregate is ¾" aggregate.

4. Apparatus, as claimed in claim 1, wherein:
    said casing is made of steel.

5. Apparatus, as claimed in claim 1, wherein: said first depth is at least 3'.

6. Apparatus, as claimed in claim 1, wherein:
    the ratio of the diameters of said first and second bore holes is approximately three to two.

7. Apparatus, as claimed in claim 1, wherein:
    said first bore hole is approximately 5' deep from the surface of the earth; and
    said second bore hole is approximately 30' deep from the surface of the earth.

8. A method of constructing a soil vapor removal well comprising the steps of:
    drilling a large diameter first bore hole from the surface of the earth to a first depth in a vadose zone;
    mounting an impervious casing whose diameter is less than that of the first bore hole concentrically within said first bore hole;

filling the first bore hole with concrete around the casing to hold the casing in place and form a substantially air-tight seal between the earth and the surface;

allowing the concrete to cure;

drilling a second bore hole of smaller diameter than the casing from the bottom of the casing to a second depth above the water table; and filling the second bore hole and the casing with aggregate.

9. A method, as claimed in claim 8, further including:

drawing a vacuum on the upper end of the casing to extract volatile hydrocarbons from surrounding portions of the vadose zone through the aggregate.

10. A method, as claimed in claim 8, wherein:

said first bore hole is 12" in diameter and drilled to a depth of 5' from the surface of the earth; and said second bore hole is 8" in diameter and drilled to a depth of 30' from the surface of the earth.

* * * * *